US009589187B1

(12) United States Patent
Chen et al.

(10) Patent No.: US 9,589,187 B1
(45) Date of Patent: Mar. 7, 2017

(54) METHOD FOR LOCATING CENTER OF PUPIL AND ELECTRONIC APPARATUS

(71) Applicant: Winbond Electronics Corp., Taichung (TW)

(72) Inventors: Yi-Chung Chen, Taipei (TW); Sheng-Jyh Wang, Hsinchu (TW)

(73) Assignee: Winbond Electronics Corp., Taichung (TW)

( * ) Notice: Subject to any disclaimer, the term of this patent is extended or adjusted under 35 U.S.C. 154(b) by 0 days.

(21) Appl. No.: 15/058,135

(22) Filed: Mar. 1, 2016

(30) Foreign Application Priority Data

Sep. 30, 2015 (CN) .......................... 2015 1 0639187

(51) Int. Cl.
 *G06K 9/00* (2006.01)
 *G06K 9/62* (2006.01)
(52) U.S. Cl.
 CPC ......... *G06K 9/0061* (2013.01); *G06K 9/00617* (2013.01); *G06K 9/6212* (2013.01)

(58) Field of Classification Search
 USPC .......................... 382/169, 168, 192, 281, 291
 See application file for complete search history.

(56) References Cited

U.S. PATENT DOCUMENTS

| 7,680,357 | B2* | 3/2010 | Yonaha ................ G06K 9/4633 382/192 |
| 8,644,565 | B2 | 2/2014 | Du et al. |
| 8,824,779 | B1 | 9/2014 | Smyth |
| 2012/0133891 | A1 | 5/2012 | Jiang |

\* cited by examiner

*Primary Examiner* — Anh Do
(74) *Attorney, Agent, or Firm* — Jianq Chyun IP Office

(57) ABSTRACT

A method and an electronic apparatus for locating the center of a pupil are provided. The method includes: obtaining a glint-free image including a pupil; generating a gradient magnitude graph and a gradient orientation graph based on the glint-free image; sifting a plurality of first pixels from the gradient magnitude graph, and finding a plurality of second pixels corresponding to the plurality of first pixels in the gradient orientation graph; taking a negative gradient orientation to each of the second pixels to generate a gradient emission graph including a plurality of emissions; defining a center of the pupil in the glint-free image based on the plurality of emissions in the gradient emission graph.

10 Claims, 6 Drawing Sheets

METHOD FOR LOCATING CENTER OF PUPIL AND ELECTRONIC APPARATUS

CROSS-REFERENCE TO RELATED APPLICATION

This application claims the priority benefit of China application serial no. 201510639187.4, filed on Sep. 30, 2015. The entirety of the above-mentioned patent application is hereby incorporated by reference herein and made a part of this specification.

BACKGROUND OF THE INVENTION

Field of the Invention

The invention relates to a method for locating the center of a pupil and an electronic apparatus.

Description of Related Art

With the improvement of technology and the changing of times, a variety of new head-mounted displays or wearable devices are continuously being introduced. To enable the devices to perform corresponding operations (e.g., changing display conditions, moving specific objects, identifying the mental state of the user, etc.) according to line of sight or pupil activities of the user, the issue of locating the center of the user's pupil accurately through image processing technology has become an important issues for researchers of the field.

SUMMARY OF THE INVENTION

Accordingly, the invention provides a method for locating the center of a pupil and an electronic apparatus capable of obtaining negative gradient orientation emissions of each of a plurality of pixels of the orientation graph after converting a glint-free image to a gradient orientation graph, and locating the center of the pupil via the intersection of the emissions.

The invention provides a method for locating the center of a pupil suitable for use with an electronic apparatus. The method includes: obtaining a glint-free image including a pupil; generating a gradient magnitude graph and a gradient orientation graph based on the glint-free image; sifting a plurality of first pixels from the gradient magnitude graph, and finding a plurality of second pixels corresponding to the first pixels in the gradient orientation graph; taking a negative gradient orientation to each of the plurality of second pixels to generate a gradient emission graph including a plurality of emissions; and defining the center of the pupil in the glint-free image according to the plurality of emissions in the gradient emission graph.

In an embodiment of the invention, the steps of obtaining the glint-free image including the pupil includes: converting an raw image including the pupil to a grayscale image; performing a histogram-equalization on the grayscale image to generate a first image; inputting the first image to a median filter to generate a second image; subtracting the second image from the first image to generate a third image, wherein the third image comprises a plurality of glint candidate pixels; filtering a first portion of the plurality of glint candidate pixels from the third image to generate a fourth image, wherein a brightness of the filtered first portion of the plurality of glint candidate pixels is lower than a specific threshold; subtracting the fourth image from the first image to generate the glint-free image.

In an embodiment of the invention, the specific threshold is a maximum threshold in the plurality of candidate thresholds, and when any of the plurality of candidate thresholds is applied on a second portion of the plurality of glint candidate pixels filtered from the third image, the plurality of unfiltered glint candidate pixels in the third image forms at least two connected areas.

In an embodiment of the invention, the gradient emission graph comprises a plurality of pixels, and the steps of defining the center of the pupil in the glint-free image based on the emissions in the gradient emission graph comprises: finding first specific pixel having a maximum magnitude in a plurality of pixels of the gradient emission graph; defining third pixel corresponding to the first specific pixel of the glint-free image as the center of the pupil.

An embodiment of the invention further comprising, after the step of defining the third pixel corresponding to the first specific pixel in the glint-free image as the center of the pupil: finding a predetermined number of specific pixels having higher magnitude from the plurality of pixels of the gradient emission graph, wherein the plurality of specific pixels is at least spaced apart from one another by a predetermined distance; finding second specific pixel located at an average location of the plurality of specific pixels; finding first candidate pixel and second candidate pixel respectively corresponding to the first specific pixel and the second specific pixel from the plurality of second pixels of the gradient orientation graph; respectively defining a first boundary region and a second boundary region of the pupil according to the first candidate pixel and the second candidate pixel; converting the first boundary region to a first polar coordinate graph comprising a plurality of first polar coordinates, and finding a first radius matching the first polar coordinates the most accordingly; recording a first quantity of the first polar coordinates matching the first radius; converting the second boundary region to a second polar coordinate graph comprising a plurality of second polar coordinates, and finding a second radius most matching the plurality of second polar coordinates the most accordingly; recording a second quantity of the second polar coordinates matching the second radius; updating the center of the pupil as a fourth pixel corresponding to the second candidate pixel in the glint-free image when the second quantity exceeds the first quantity.

An electronic apparatus, comprising a memory device and a processor. A memory device capable of storing a plurality of modules. a processor, coupled to the memory device, accessing and executing the plurality of modules. The plurality of modules includes a obtaining module, a first generating module, a sifting module, a second generating module, and a defining module. The obtaining module obtains a glint-free image including a pupil. The first generating module generates a gradient magnitude graph and a gradient orientation graph based on the glint-free image. The sifting module sifts a plurality of first pixels from the gradient magnitude graph and finds a plurality of second pixels corresponding to the plurality of first pixels in the gradient orientation graph. The second generating module takes a negative gradient orientation to each of the plurality of second pixels to generate a gradient emission graph comprising plurality of emissions. The defining module defines the center of the pupil in the glint-free image based on the plurality of emissions in the gradient emission graph.

In an embodiment of the invention, the obtaining module is configured to convert an raw image comprising the pupil to a grayscale image; perform a histogram-equalization on the grayscale image to generate a first image; input the first image to a median filter to generate a second image; subtract the second image from the first image to generate a third image, wherein the third image comprises a plurality of glint candidate pixels; filter a first portion of the plurality of glint candidate pixels from the third image to generate a fourth image, wherein the brightness of the filtered first portion of the plurality of glint candidate pixels is lower than a specific threshold; subtract the fourth image from the first image to generate the glint-free image.

In an embodiment of the invention, the specific threshold is a maximum threshold in the plurality of candidate thresholds, and when any of the plurality of candidate thresholds is applied on a second portion of the plurality of glint candidate pixels filtered from the third image by the obtaining module, the plurality of unfiltered glint candidate pixels in the third image faiths at least two connected areas.

In an embodiment, the gradient emission graph includes a plurality of pixels, and the defining module is configured to: find first specific pixel having a maximum magnitude in a plurality of pixels of the gradient emission graph; define third pixel corresponding to the first specific pixel of the glint-free image as the center of the pupil.

In an embodiment of the invention, the electronic apparatus further comprising an updating module configured to: find a predetermined number of specific pixels having higher magnitude from the plurality of pixels of the gradient emission graph, wherein the plurality of specific pixels are at least spaced apart from one another by a predetermined distance; finding second specific pixel located at an average location of the plurality of specific pixels; find first candidate pixel and second candidate pixel respectively corresponding to the first specific pixel and the second specific pixel from the plurality of second pixels of the gradient orientation graph; respectively define a first boundary region and a second boundary region of the pupil according to the first candidate pixel and the second candidate pixel; convert the first boundary region to a first polar coordinate graph comprising a plurality of first polar coordinates, and finding a first radius matching the first polar coordinates the most accordingly; recording a first quantity of the first polar coordinates matching the first radius; converting the second boundary region to a second polar coordinate graph comprising a plurality of second polar coordinates, and finding a second radius most matching the plurality of second polar coordinates the most accordingly; recording a second quantity of the second polar coordinates matching the second radius; updating the center of the pupil as a fourth pixel corresponding to the second candidate pixel in the glint-free image when the second quantity exceeds the first quantity.

Accordingly, the invention provides a method for locating the center of a pupil and an electronic apparatus could convert a glint-free image to a gradient magnitude graph and a gradient orientation graph, and take negative gradient orientation emissions on some of the pixels of the gradient orientation graph. Afterwards, the method proposed in the embodiments of the invention could locate the center of the pupil via the intersections of the emissions.

To make the aforementioned and other features and advantages of the invention more comprehensible, several embodiments accompanied with drawings are described in detail as follows.

DESCRIPTION OF THE EMBODIMENTS

Figure 1:
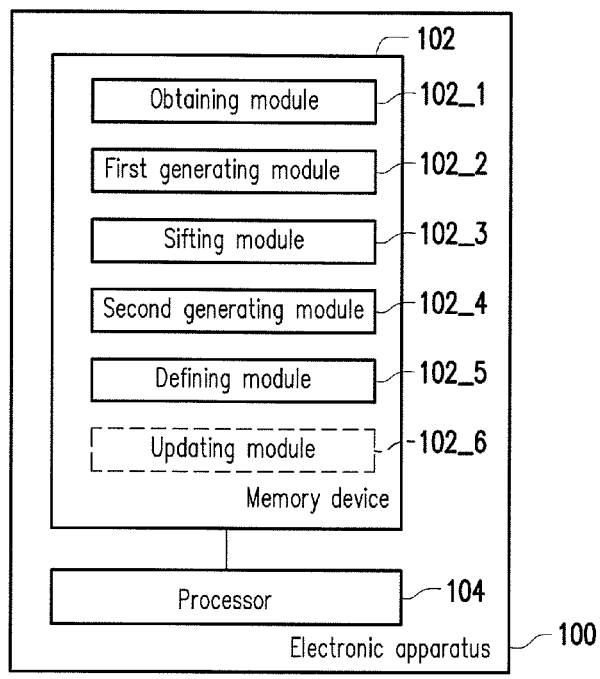
FIG. 1 is a schematic diagram of an electronic apparatus according to an embodiment of the invention.

FIG. 1 is a schematic diagram of an electronic apparatus according to an embodiment of the invention. In the present embodiment, the electronic apparatus 100 includes a memory device 102 and a processor 104. The electronic apparatus 100 may be, for instance, a wearable device, a head-mounted display, a personal computer, a notebook computer, a tablet, a smart phone, or other similar devices, but the invention is not limited thereto.

The memory device 102 may be, for instance, a memory, a hard drive, or any other element capable of storing data, and is capable of recording multiple program codes or modules. The processor 104 coupled to the memory device 102 may be a general purpose processor, a specific purpose processor, a traditional processor, a digital processor, one or more microprocessors, a controller, a micro controller with a digital signal processor core, a controller, a micro controller, an application specific integrated circuit (ASIC), a field programmable gate array (FGPA), any other type of integrated circuit, a finite state machine, a processor based on advanced RISC machine (ARM), or the like.

In the present embodiment, the processor 104 is capable of accessing and executing an obtaining module 102_1, a generating module 102_2, a sifting module 103_3, a second generating module 102_4, and a defining module 102_5 of the memory device 102 to execute the method for locating the center of a pupil of the invention.

Figure 2:
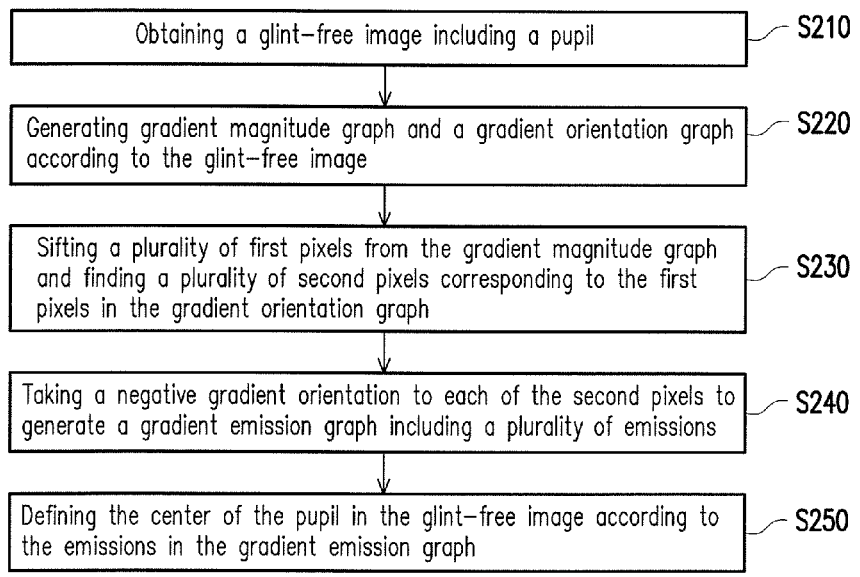
FIG. 2 is flowchart of a method for locating the center of a pupil proposed by an embodiment of the invention.

Referring to FIG. 2, FIG. 2 is a flowchart of method for locating the center of a pupil according to an embodiment of the invention. The method of the present embodiment may be executed by the electronic apparatus 100. The elements shown in FIG. 1 are used to illustrate the details of each step.

First, in step S210, the obtaining module 102_1 could obtain a glint-free image including a pupil. In the present embodiment, the obtaining module 102_1 is, for instance, capable of removing glint from a raw image including a pupil via the process as illustrated in FIG. 3, such that a glint-free image is generated.

Figure 3:
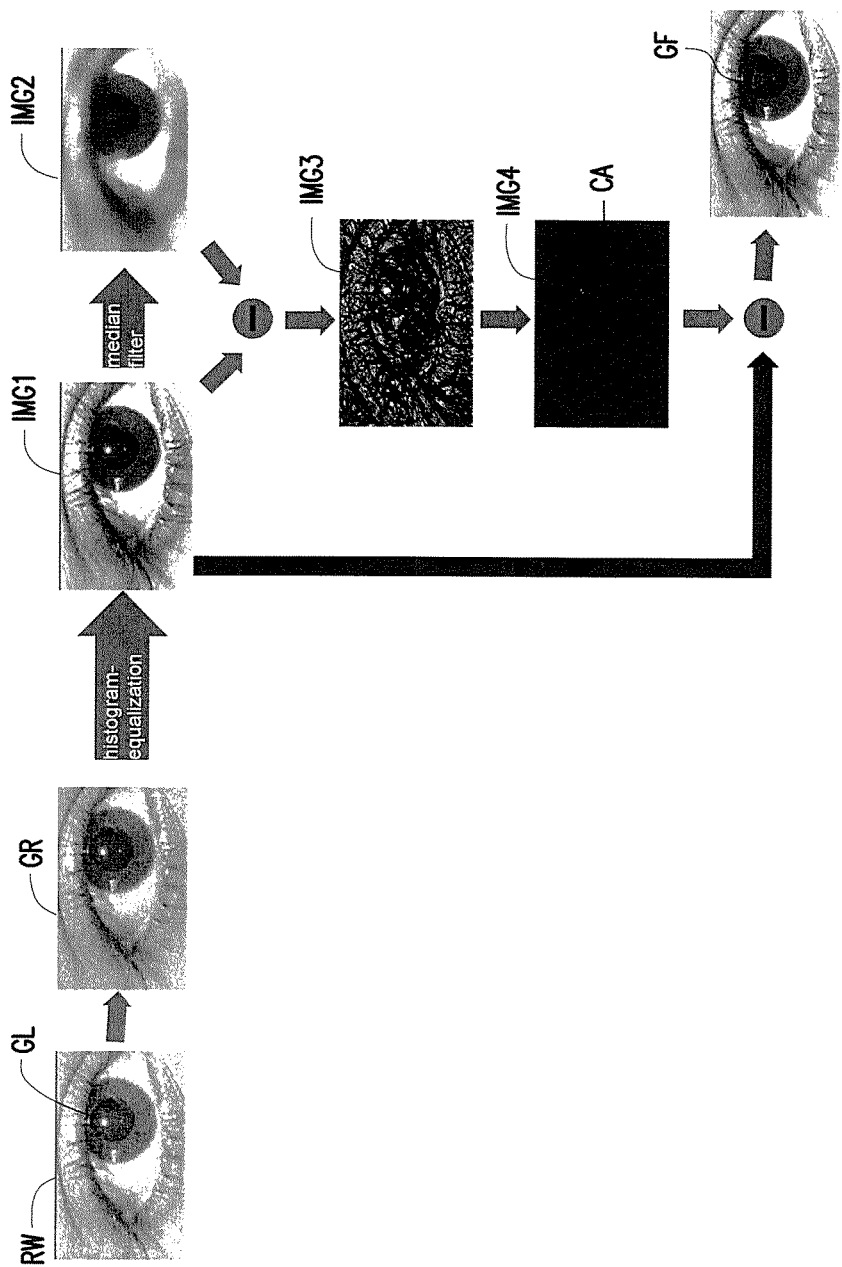
FIG. 3 is a schematic diagram of glint removal according to an embodiment of the invention.

Referring to FIG. 3, FIG. 3 is a schematic diagram of glint removal according to an embodiment of the invention. In the present embodiment, a raw image RW is, for instance, an image of an eye retrieved by cameras (not illustrated), or an image of an eye obtained from another storage location by the obtaining module 102_1, but the invention is not limited thereto. Next, the obtaining module 102_1 could sequentially (1) convert the raw image RW to a grayscale graph GR; (2) perform histogram equalization on the grayscale graph GR in order to generate a first image IMG1; (3) input the first image IMG1 to a median filter in order to generate a second image IMG2; (4) subtract the second image IMG2 from the first image IMG1 in order to generate a third image IMG3. The third image IMG3 shows that it contains a plurality of glint candidate pixels, and the invention further proposes a mechanism to find the glint candidate pixels most likely to be the actual glints.

More particularly, in the case that the brightness of each glint candidate pixel is between a brightness upper limit (e.g., 255) and a brightness lower limit (e.g., 0), the obtaining module 102_1 may firstly use the lower limit (e.g., 0) as a threshold, and filter glint candidate pixels with brightness lower than this threshold from the third image IMG3. At this time, the obtaining module 102_1 could determine if the unfiltered glint candidate pixels form at least two connected areas. If yes, the obtaining module 102_1 records the present threshold (i.e., 0) as a candidate threshold; if not, the obtaining module 102_1 continues using 1 (adding 1 to 0) as the threshold, and filters out glint candidate pixels with brightness lower than this threshold from the third image IMG3 again. At this time, the obtaining module 102_1 could determine again if the unfiltered glint candidate pixels form at least two connected areas. If yes, the obtaining module 102_1 similarly records the present threshold (i.e., 1) as a candidate threshold; if not, the obtaining module 102_1 could recursively perform the above described operation using gradually increased thresholds.

In an embodiment, the obtaining module 102_1 could use the maximum threshold of the candidate thresholds as the specific threshold, and accordingly filter a portion of the glint candidate pixels from the third image IMG3 (i.e., the brightness is lower than the glint candidate pixels of the specific threshold) in order to generate a fourth image IMG4. More particularly, in the case that the thresholds recorded by the obtaining module 102_1 according to the above described recursive operations are 25 to 193, when the threshold is less than 25, the unfiltered glint candidate pixels form a large, single connected area due to being connected to each other. At the same time, in the case that the threshold is greater than 194, either all the glint candidate pixels have been filtered (i.e., 0 connected area) or the unfiltered glint candidate pixels form a single small connected area due to being connected with each other. This connected area expands as the threshold decreases. Therefore, when the obtaining module 102_1 generates the fourth image IMG4 according to the specific threshold (i.e., 193), although the fourth image IMG4 includes at least two connected areas, the connected area with the largest surface CA, could most accurately match the glints of the raw image RW.

In another embodiment, the obtaining module 102_1 may also firstly use the upper limit of brightness (e.g., 255) as the threshold and filter glint candidate pixels with brightness less than this threshold from the third image IMG3. At this time, the obtaining module 102_1 determines if the unfiltered glint candidate pixels form at least two connected areas. If not, then the obtaining module 102_1 could continue and use 254 as the threshold and filter glint candidate pixels with brightness less than this threshold from the third image IMG3 again. At this time, the obtaining module 102_1 determines again if the unfiltered glint candidate pixels form at least two connected areas. If still not, then the obtaining module 102_1 could recursively perform the above described operation using gradually decreased thresholds until a threshold which allows the unfiltered glint candidate pixels to form at least two connected areas is found. That threshold is the specific threshold (e.g., 193). In this way, the obtaining module 102_1 could find the specific threshold more effectively.

Refer to FIG. 3. After generating the fourth image IMG4 according to the teachings disclosed above, the obtaining module 102_1 could subtract the fourth image IMG4 from the first image IMG1 to generate a glint-free image GF. FIG. 3 provides a clear view showing the glint spot GL which existed in the raw image RW that no longer exists in the glint-free image GF. It should be understood that although the obtaining module 102_1 could convert the raw image RW to the glint-free image GF according to the process in FIG. 3, in the other embodiments, the obtaining module 102_1 could also remove the glint spot GL of the raw image RW based on other existing glint removal algorithm.

Figure 4:
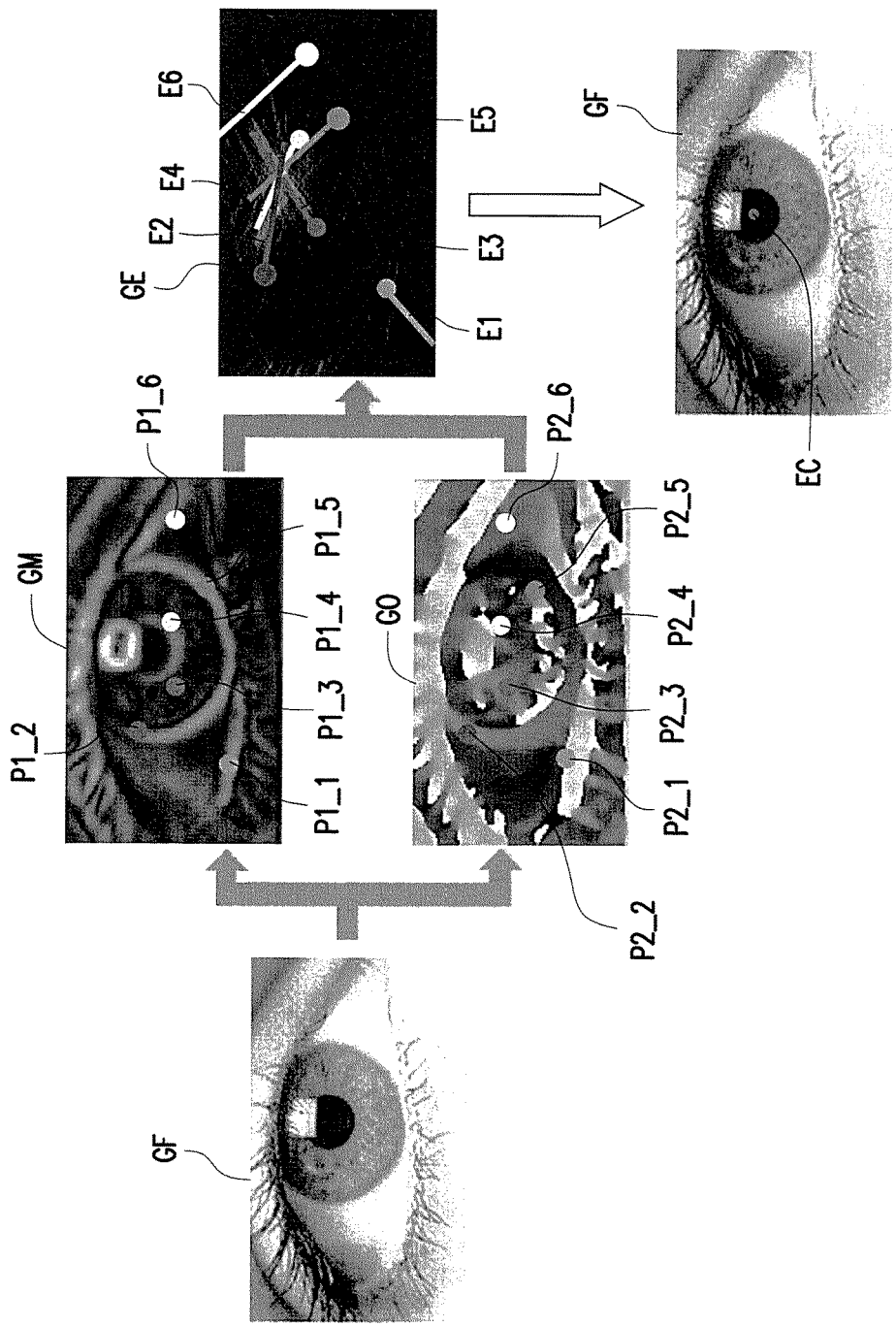
FIG. 4 is a schematic diagram of locating the center of a pupil according to an embodiment of the invention.

Refer to FIG. 2 again. After the obtaining module 102_1 executes step S210 to obtain the glint-free image (e.g., glint-free image GF), other modules of the memory device 102 could continue to execute steps S220 to S250. The contents of FIG. 4 are used to facilitate clearer explanation of the concepts of steps S220 to S250. In step S220, the generating module 102_2 generates a gradient magnitude graph GM and a gradient orientation graph GO based on the glint-free image GF. In an embodiment, the generating module 102_2 could generate the gradient magnitude graph GM and the gradient orientation graph GO of the glint-free image GF according to Sobel filter or other similar edge detection algorithm (e.g., Canny edge detection algorithm) or Prewitt filter, which would not be described in detail herein.

In step S230, the sifting module 1023 could sift a plurality of first pixels (e.g., first pixels P1_1 to P1_6) from the gradient magnitude graph GM and find a plurality of second pixels (e.g., second pixels P2_1 to P2_6) corresponding to the plurality of first pixels in the gradient orientation graph. In the present embodiment, each of the first pixels sifted by the sifting module 102_3 has a gradient magnitude greater than a predetermined threshold. The threshold is, for instance, any value of a gradient range (e.g., 0 to 255) which may be chosen based on the requirements of the designer. FIG. 4 shows the location of first pixel P1_1 in the gradient magnitude graph GM is the same as the location of the second pixel P2_1 in the gradient orientation graph GO, and the location of the first pixel P1_2 in the gradient magnitude graph GM is the same as the location of the second pixel P2_2 in the gradient orientation graph GO. The corresponding relationships between the first pixels P1_3 to P1_6 and P2_3 to P2_6 could be derived according to the above teachings, which would not be further described herein.

In step S240, the second generating module 102_4 could take a negative gradient orientation to each of the plurality of second pixels to generate a gradient emission graph GE comprising plurality of emissions. For instance, in the gradient emission graph GE, emissions E1 to E5 negative gradient orientations respectively corresponding to the second pixels P2_1 to P2_6. In an embodiment, the length of the plurality of emissions is, for instance, half of the height of the glint-free image GF, but the invention is not limited thereto.

Next, in step S250, the defining module 102_6 defines the center of the pupil in the glint-free image GE based on the plurality of emissions in the gradient emission graph. In an embodiment, the gradient emission graph GE could include a plurality of pixels, and the defining module 102_5 could find a pixel having the maximum magnitude from the pixels. Take FIG. 4 for instance, the plurality of emissions (e.g., emissions E1 to E6) could be interlaced in the gradient emission graph GE and generate multiple regions having higher magnitude. In this way, the defining module 102_5 could take the brightest pixel of the region (e.g., the intersection point of emissions E2 to E5) as the first specific pixel. Next, the defining module 102_5 could define third pixels corresponding to the first specific pixels of the glint-free image GF as the center of the pupil.

In another embodiment, the defining module 102_6 could perform step S250 according only to a portion of the plurality of emissions. For instance, the defining module 102_6 could firstly exclude the emissions having slopes outside a predetermined range, and find a first specific emission only from the unexcluded emissions. For instance, in the case that the predetermined range is between −1 and 1, the defining module 102_6 could exclude those emissions being closer to vertical, and find the first specific pixel only from emissions being closer to horizontal. In this way, when the upper and/or lower edge of the pupil are obscured, the method of the present embodiment could still locate the center of the pupil. In another embodiment, the designer may also adjust the predetermined range based on requirements.

In another embodiment, the memory device 102 could further include an updating module 102_6 used in a mechanism to further update the center of the pupil after the defining module 102_5 defines the center of the pupil in order to improve locating accuracy.

Figure 5:
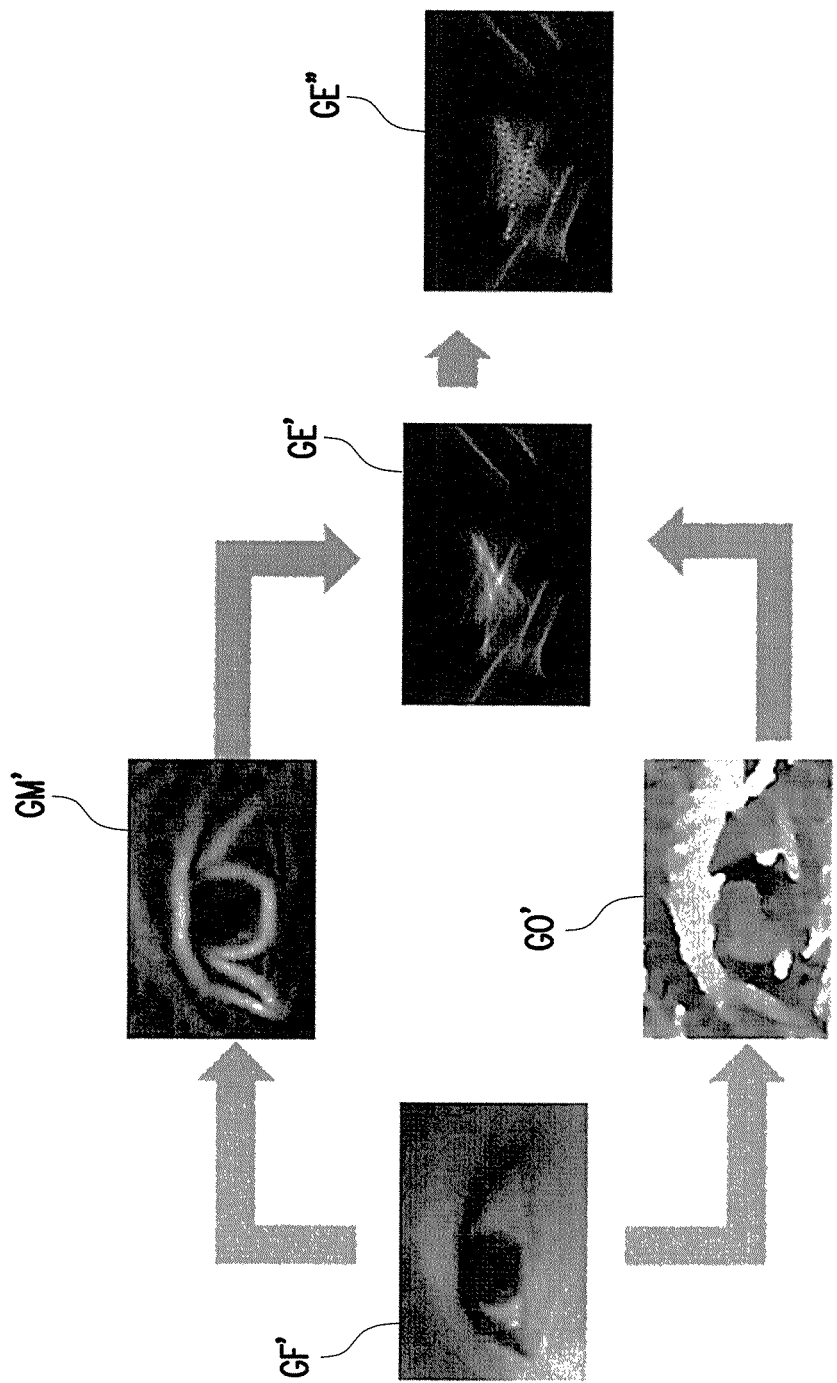
FIG. 5 is a schematic diagram of locating the center of a pupil according to an embodiment of the invention.

Referring to FIG. 5, FIG. 5 is a schematic illustrating the update of the center of the pupil according to an embodiment of the invention. In the present embodiment, the electronic apparatus 100 could convert the glint-free image GF to the gradient magnitude graph GM and the gradient orientation graph GO according to the teachings above, and generate the gradient emission graph GE based on the gradient magnitude graph GM and the gradient orientation graph GO. The details would not be repeated herein. Different from the previous embodiments, the updating module 102_6 of the present embodiment could further find a predetermined number of specific pixels having higher magnitude from the plurality of pixels of the gradient emission graph GE, wherein the plurality of specific pixels is at least spaced apart from one another by a predetermined distance (e.g., 10 pixels). Refer to the gradient emission graph GE'', which illustrates each of the specific pixels (marked as white spots) found from the gradient emission graph GE by the updating module 102_6 when the predetermined number is 31. Next, the updating module 102_6 could find a second specific pixel located in the average location of these specific pixels, and then find first candidate pixel and second candidate pixels respectively corresponding to the first specific pixels and the second specific pixels from a gradient orientation graph GO'. Next, the updating module 102_6 could respectively define a first boundary and a second boundary of the pupil according to the first candidate pixels and the second candidate pixels.

Figure 6:
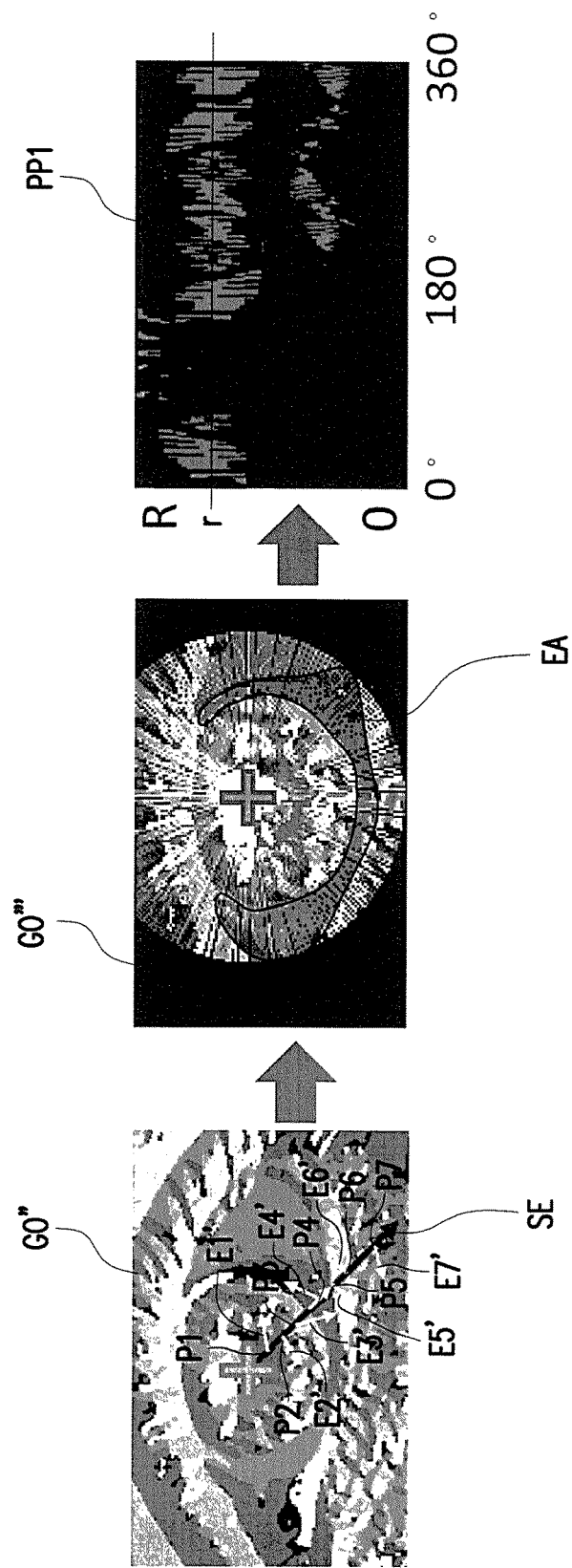
FIG. 6 is a schematic diagram of defining of boundary regions of a pupil according to an embodiment of the invention.

Referring to FIG. 6, FIG. 6 is a schematic diagram of an embodiment illustrating the definition of boundaries of the pupil. In the present embodiment, in the case that the cross symbol of the gradient orientation graph GO'' is the first candidate pixel, the updating module 102_6 could use it as a starting point to radially take a plurality of specific emissions. In an embodiment, the length of the specific emissions is, for instance, half of the height of the glint-free image GF, but the invention is not limited thereto. Next, the updating module 102_6 could compare each of the specific emissions to the pixels it passes and mark pixels which meet certain specific conditions. Taking the specific emission SE as an example. Assuming that the specific emission SE passes pixels P1 to P7 having emission orientations E1 to E7, the updating module 102_6 could individually compare the orientation of the specific emission SE to the orientation of emissions E1' to E7'. When the difference between the specific emission SE and any of the emission E1 to E7 (e.g., the emission E3) is smaller than a value (e.g., 10 degrees), the updating module 102_6 could mark the corresponding pixel (e.g., the pixel P3).

Next, the updating module 102_6 could perform the above operation on each of the specific emissions and mark all the pixels that meet the above described certain conditions, as illustrated by gradient orientation graph GO'''. In the gradient orientation graph GO''', the updating module 102_6 could define a region formed by all the marked pixels EA as a first boundary region of the pupil. Next, the updating module 102_6 could convert the first boundary region to a first polar coordinate graph PP 1 having a plurality of first polar coordinates. Each of the first polar coordinates of the first polar coordinate graph PP 1 corresponds to the pixels marked in the gradient orientation graph GO'''. The X-axis of the first polar coordinate graph PP1 is the angle, the Y-axis is the distance between of each polar coordinate and the first candidate pixel (i.e., the cross symbol). As discussed before, the length of the specific emissions is, for instance, half of that of the glint-free image (represented by R), thus the greatest distance between each first polar coordinate and the first candidate pixel is R, but the invention is not limited thereto. Next, the updating module 102_6 could find a first radius r matching the plurality of first polar coordinates the most from the first polar coordinate graph PP 1, and record a first quantity of the plurality of first coordinates matching the first radius. The first quantity may be, for example, the number of the first polar coordinates re spaced apart from the first candidate by the first radius r.

In another embodiment, the updating module 102_6 could also find a concentric arc matching the first boundary region EA the most by using a first candidate pixel as the center of a circle. In the case that the concentric arc is a region between a radius a and a radius b, the concentric arc could represent a specific horizontal line of a height between a and b in the first polar coordinate graph. In the present embodiment, the first quantity could represent the quantity of the plurality of first polar coordinates matching the specific horizontal line, i.e., the quantity of the first polar coordinates are apart from the first candidate pixels by the distance between a and b.

Regarding the second candidate pixels, the updating module 102_6 could also find pixels meeting the above described conditions based on the teachings above, such that the region formed by all the marked pixels could be defined as a second boundary region. Next, the updating module 102_6 could convert the second boundary region to a second polar coordinate graph having a plurality of second polar coordinates, and find a second radius matching the second polar coordinates the most, and record a second quantity of the plurality of second polar coordinates matching the second radius. The details would not be repeated herein.

Figure 7:
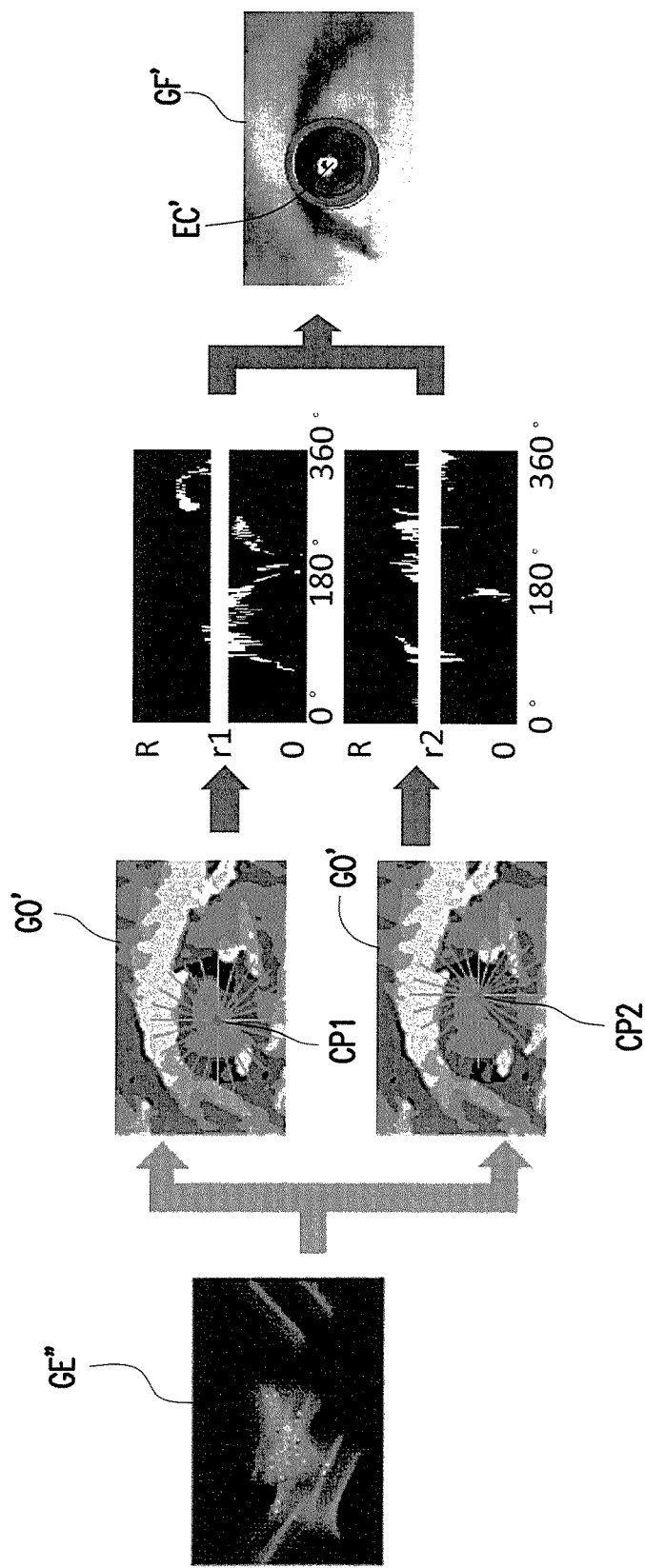
FIG. 7 is a schematic diagram of updating the center of a pupil according to FIG. 5.

Refer to FIG. 7. FIG. 7 is a schematic diagram of updating the center of the pupil according to FIG. 5. Next, the updating module 102_6 could find a second specific pixel located in the average location of these specific pixels, and then find first candidate pixels and second candidate pixels respectively corresponding to the first specific pixels and the second specific pixels from a gradient orientation graph GO'. Next, the updating module 102_6 could find a corresponding radius r1 and a corresponding radius r2 based on a first candidate pixel CP1 and a second candidate pixel CP2 based on the teachings of FIG. 6, and record the corresponding first quantity and second quantity. The details would not be repeated herein. When the second quantity is less than the first quantity, this represents that the first candidate pixel CP1 is closer to the center of the pupil, and therefore the updating module 102_6 could maintain a third pixel of the glint-free image GF corresponding to the first candidate pixel CP1 as the center of the pupil EC'. In another embodiment, when the second quantity is greater than the first quantity, this represents that the second candidate pixel CP2 is in actually closer to the center of the pupil. Therefore, the updating module 102_6 could update the center of the module as a fourth pixel of the glint-free image GF corresponding to the second candidate pixel CP2.

Based on the above, the embodiments of the invention propose a method for locating the center of a pupil and an electronic apparatus could convert a glint-free image to a gradient magnitude graph and a gradient orientation graph, and take negative gradient orientation emissions on some of the pixels of the gradient orientation graph. Afterwards, the method proposed in the embodiments of the invention could locate the center of the pupil via the intersections of the emissions. Additionally, the embodiments of the invention further propose a mechanism to further update the center of a pupil, such that the center of the pupil being found is closer to the actual center of the pupil. Also, experiments have proved that the methods proposed by the embodiments of the invention are suitable for all types of pupils (e.g., pupils obscured by eyelid or eyelash, smaller pupils, or pupils not being perfectly round, etc.)

It will be apparent to those skilled in the art that various modifications and variations could be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for locating a center of a pupil, suitable for use with an electronic apparatus, comprising:
    obtaining a glint-free image comprising a pupil;
    generating a gradient magnitude graph and a gradient orientation graph based on the glint-free image;
    sifting a plurality of first pixels from the gradient magnitude graph, and finding a plurality of second pixels corresponding to the first pixels in the gradient orientation graph;
    taking a negative gradient orientation to each of the plurality of second pixels to generate a gradient emission graph comprising a plurality of emissions; and
    defining the center of the pupil in the glint-free image according to the plurality of emissions in the gradient emission graph.

2. The method according to claim 1, wherein the step of obtaining the glint-free image comprising the pupil comprises:
    converting an raw image comprising the pupil to a grayscale image;
    performing a histogram-equalization on the grayscale image to generate a first image;
    inputting the first image to a median filter to generate a second image;
    subtracting the second image from the first image to generate a third image, wherein the third image comprises a plurality of glint candidate pixels;
    filtering a first portion of the plurality of glint candidate pixels from the third image to generate a fourth image, wherein a brightness of the filtered first portion of the plurality of glint candidate pixels is lower than a specific threshold; and
    subtracting the fourth image from the first image to generate the glint-free image.

3. The method according to claim 2, wherein the specific threshold is a maximum threshold in the plurality of candidate thresholds, and when any of the plurality of candidate thresholds is applied on a second portion of the plurality of glint candidate pixels filtered from the third image, the plurality of unfiltered glint candidate pixels in the third image forms at least two connected areas.

4. The method according to claim 1, wherein the gradient emission graph comprises a plurality of pixels, and the step of defining the center of the plurality of pupil in the glint-free image based on the emissions in the gradient emission graph comprises:
    finding a first specific pixel having a maximum magnitude in the plurality of pixels of the gradient emission graph; and
    defining a third pixel corresponding to the first specific pixel of the glint-free image as the center of the pupil.

5. The method as claimed in claim 4, wherein after the step of defining the third pixel corresponding to the first specific pixel in the glint-free image as the center of the pupil, further comprising:
    finding a predetermined number of specific pixels having higher magnitude from the plurality of pixels of the gradient emission graph, wherein the plurality of specific pixels are at least spaced apart from one another by a predetermined distance;
    finding a second specific pixel located at an average location of the plurality of specific pixels;
    finding a first candidate pixel and a second candidate pixel respectively corresponding to the first specific pixel and the second specific pixel from the plurality of second pixels of the gradient orientation graph;
    respectively defining a first boundary region and a second boundary region of the pupil according to the first candidate pixel and the second candidate pixel;
    converting the first boundary region to a first polar coordinate graph comprising a plurality of first polar coordinates, and finding a first radius matching the first polar coordinates the most accordingly;
    recording a first quantity of the first polar coordinates matching first radius;
    converting the second boundary region to a second polar coordinate graph comprising a plurality of second polar coordinates, and finding a second radius most matching the plurality of second polar coordinates the most accordingly;
    recording a second quantity of the second polar coordinates matching the second radius;
    updating the center of the pupil as a fourth pixel corresponding to the second candidate pixel in the glint-free image when the second quantity exceeds the first quantity.

6. An electronic apparatus, comprising:
    a memory device, storing a plurality of modules; and
    a processor, coupled to the memory device, accessing and executing the plurality of modules, the plurality of modules comprising:
        a obtaining module, obtaining a glint-free image comprising a pupil;
        a first generating module, generating a gradient magnitude graph and a gradient orientation graph based on the glint-free image;
        a sifting module, sifting a plurality of first pixels from the gradient magnitude graph, and finding a plurality of second pixels corresponding to the plurality of first pixels in the gradient orientation graph;

a second generating module, taking a negative gradient orientation to each of the plurality of second pixels to generate a gradient emission graph comprising plurality of emissions; and a defining module, defining a center of the pupil in the glint-free image based on the plurality of emissions in the gradient emission graph.

7. The electronic apparatus according to claim 6, wherein the obtaining module is configured to:

converting an raw image comprising the pupil to a grayscale image;

performing a histogram-equalization on the grayscale image to generate a first image;

inputting the first image to a median filter to generate a second image;

subtracting the second image from the first image to generate a third image, wherein the third image comprises a plurality of glint candidate pixels;

filtering a first portion of the plurality of glint candidate pixels from the third image to generate a fourth image, wherein a brightness of the filtered first portion of the plurality of glint candidate pixels is lower than a specific threshold; subtract the fourth image from the first image to generate the glint-free image.

8. The electronic apparatus according to claim 7, wherein the specific threshold is a maximum threshold in the plurality of candidate thresholds, and when any of the plurality of candidate thresholds is applied by the obtaining module to filter the second portion of the glint candidate pixels from the third image, the unfiltered plurality of glint candidate pixels in the third image form at least two connected areas.

9. The electronic device according to claim 6, wherein the gradient emission graph comprises a plurality of pixels, and the defining module is configured to:

finding a first specific pixel having a maximum magnitude in the plurality of pixels of the gradient emission graph; and defining a third pixel corresponding to the first specific pixel of the glint-free image as the center of the pupil.

10. The electronic apparatus according to claim 9, further comprising an updating module configured to:

finding a predetermined number of specific pixels having higher magnitude from the plurality of pixels of the gradient emission graph, wherein the plurality of specific pixels are at least spaced apart from one another by a predetermined distance;

finding a second specific pixel located at an average location of the plurality of specific pixels;

finding a first candidate pixel and a second candidate pixel respectively corresponding to the first specific pixel and the second specific pixel from the plurality of second pixels of the gradient orientation graph;

respectively defining a first boundary region and a second boundary region of the pupil according to the first candidate pixel and the second candidate pixel;

converting the first boundary region to a first polar coordinate graph comprising a plurality of first polar coordinates, and finding a first radius matching the first polar coordinates the most accordingly;

recording a first quantity of the first polar coordinates matching first radius;

converting the second boundary region to a second polar coordinate graph comprising a plurality of second polar coordinates, and finding a second radius most matching the plurality of second polar coordinates the most accordingly;

recording a second quantity of the second polar coordinates matching the second radius;

updating the center of the pupil as a fourth pixel corresponding to the second candidate pixel in the glint-free image when the second quantity exceeds the first quantity.

* * * * *